United States Patent [19]

Waiwood

[11] 4,318,613
[45] Mar. 9, 1982

[54] UNIVERSAL LIGHT INTEGRATOR/TIMER FOR PHOTOGRAPHIC EQUIPMENT

[75] Inventor: William P. Waiwood, Cleveland, Ohio

[73] Assignee: The Nuarc Company, Inc., Chicago, Ill.

[21] Appl. No.: 138,923

[22] Filed: Apr. 10, 1980

[51] Int. Cl.³ .............................................. G03B 27/72
[52] U.S. Cl. ......................................... 355/68; 355/83
[58] Field of Search .................................... 355/35–38, 355/67–71, 83

[56] References Cited

U.S. PATENT DOCUMENTS 3,768,903 10/1973 Steinberger et al. .................. 355/38
3,795,444 3/1974 Glidden et al. ........................ 355/68
4,140,391 2/1979 Laciak et al. ...................... 355/68 X
4,150,894 4/1979 Meyer et al. ............................ 355/38

*Primary Examiner*—L. T. Hix
*Assistant Examiner*—W. J. Brady

*Attorney, Agent, or Firm*—Mason, Kolehmainen, Rathburn & Wyss

[57] ABSTRACT

A universal light intergrator/timer is provided for use with photographic equipment wherein several desired exposure intervals for each of a plurality of light sources may be preset and stored in a microprocessor for instant selection by the operator during a photographic operation.

When a stable light source is used the system is arranged to function as a timer and counts pulses derived from the AC line to control the light source in accordance with the preset exposure intervals.

When a light source is used whose wavelength and intensity varies during warmup, the system is arranged to function as a light integrator. To obtain light integration the current flowing in a photodiode, which is linear with respect to light output, is amplified and converted to variable frequency pulses which are counted by the microprocessor to control the light source in accordance with the present exposure intervals.

16 Claims, 11 Drawing Figures

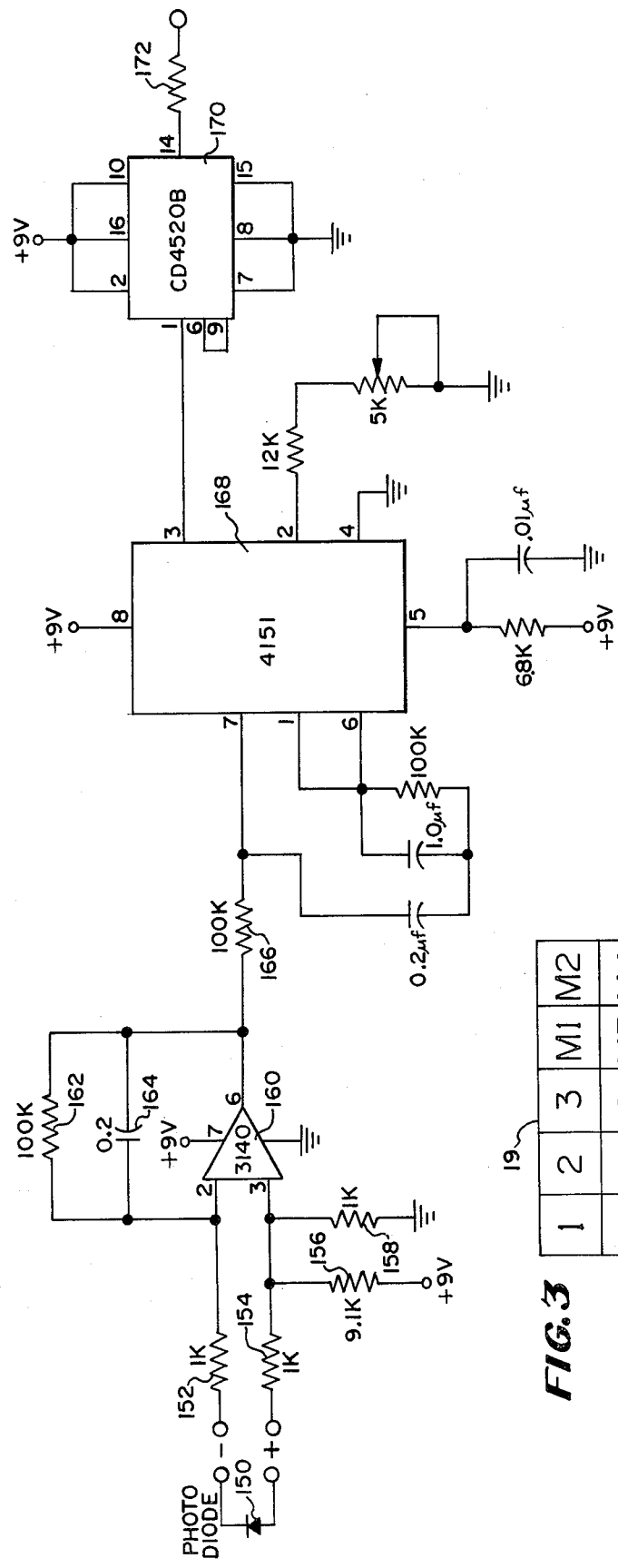

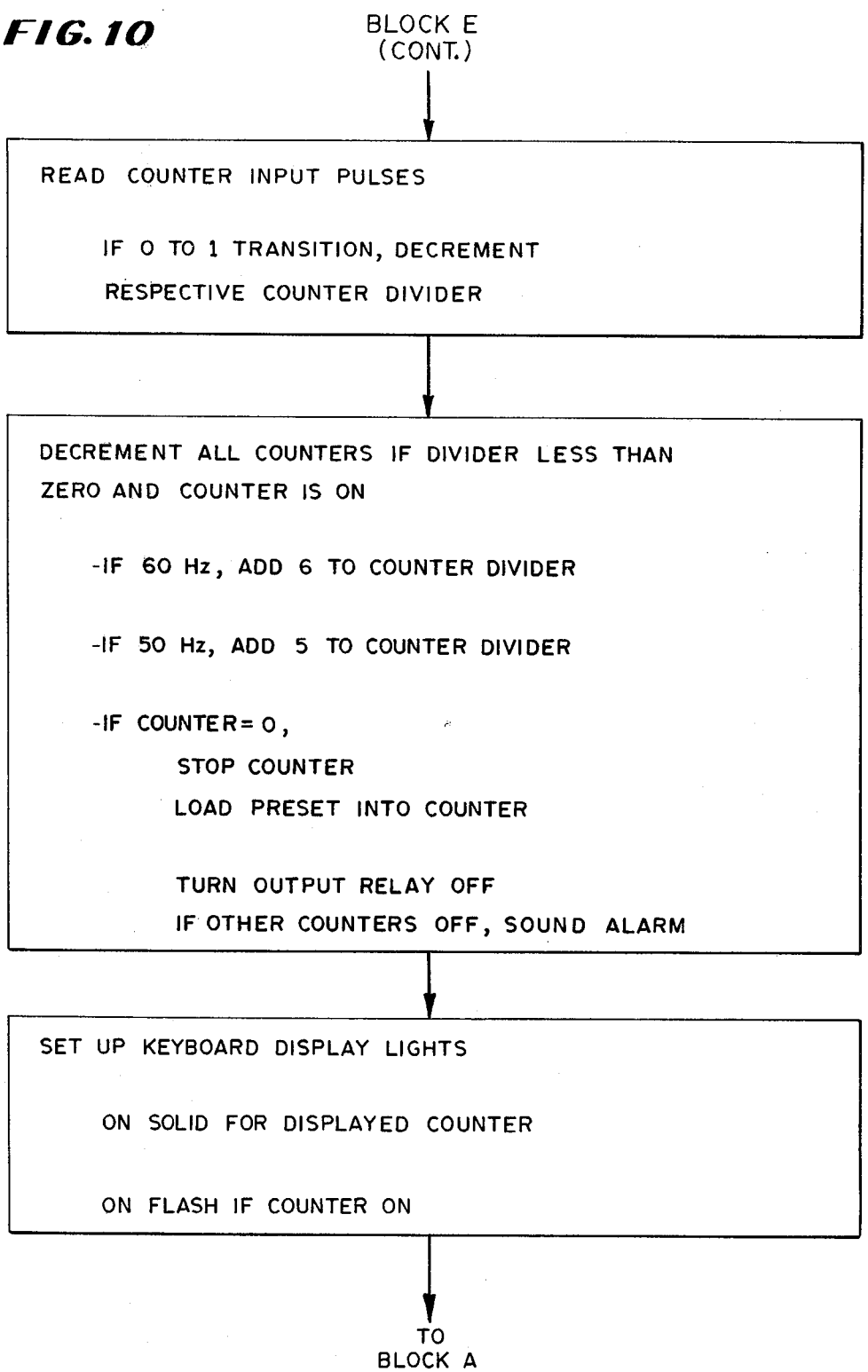

UNIVERSAL LIGHT INTEGRATOR/TIMER FOR PHOTOGRAPHIC EQUIPMENT

The present invention relates to light integrating and timing equipment, and, more particularly, to light integrating and timing equipment which is particularly designed for use with various types of photographic equipment.

In order to provide a universal light integrator/timer which may be used with various types of photographic equipment a number of conflicting requirements must be resolved. In some types of equipment, such as the so-called "plate makers" which are employed in the printing industry for the exposure of plates, gas discharge lamps which may range in size from 750 watts to 4,000 watts are employed as the single light source. These gas discharge lamps must reach a design dependent operating temperature in order for their light output to become stabilized in wavelength and intensity. This warmup time can vary from fifteen seconds to more than a minute and during this warmup time the output of the lamp may vary widely relative to steady state operations. Since under normal conditions the lamp is continuously being turned on and off without reaching a stable operating point, the result is that the lamp is continually operated in a region in which its light output is varying. This results in the exposure time varying greatly as a function of the lamp temperature at lamp turn-on time.

While certain arrangements have heretofore employed a light integrating arrangement wherein the voltage output of a photodiode is integrated, this voltage characteristic of the photodiode is logarithmic with light output, and hence errors can occur when comparing the integrated photodiode voltage with a preset level on an analog voltage basis.

Other types of photographic equipment may use stable light sources, such as incandescent lamps, in which a simple timer can be employed to determine exposure intervals. Furthermore, while the plate makers used in the printing industry have only one light source which must be controlled, other types of studio camera equipment may require several different light sources, such as a main lighting source, a back lighting source and a flash lighting source, each of which must be contolled to a desired exposure time. In such equipment, several different exposure times may be used frequently and it would be desirable for the operator to be able to select instantaneously any desired exposure for each type of light source. The operator should also be advised of the exposure interval that has been selected for each type of light source and should be able to modify each exposure interval in a simple and efficient manner.

It would also be desirable to provide an indication to the operator that the timing or exposure interval is taking place, and, if multiple lamps are used, that the exposure intervals for all lamps have been completed.

It is, therefore, an object of the present invention to provide a new and improved universal light integrator/timer for photographic equipment which avoids one or more of the above-discussed disadvantages of prior art arrangements and/or provides one or more of the above-discussed desirable features.

It is a further object of the present invention to provide a light integrator arrangement in which a control signal is provided which is linear with respect to light output, this control signal being converted to a pulse type signal and digital techniques employed to count the pulses so that a low-cost high repeatability light integrator is provided.

It is another object of the present invention to provide a new and improved universal light integrator/timer which may be used either as a simple timer for photographic equipment employing a stable light source, or may be used as a light integrator for photographic equipment which has a light source whose light output varies over a wide range during an exposure interval.

It is a further object of the present invention to provide a new and improved universal light integrator/timer which may be used with photographic equipment utilizing only a single light source or with equipment using several light sources each requiring different exposure times.

It is a further object of the present invention to provide a new and improved universal light-integrator timer for use with photographic equipment wherein several different exposures for each of several different lamps may be pre set by the operator and instantly selected for a particular photographic operation.

Briefly considered, the present invention provides a basic light timer control unit which may be adapted for light integration measurements of several different light sources by plugging in separate light integrator units, one for each light source. The basic timer unit involves a microprocessor and associated keyboard whereby various desired exposure intervals may be pre set by the operator and employed to control relays associated with each individual light so as to control the exposure interval thereof.

A digital multiplexing arrangement is employed so that a plurality of light sources may be simultaneously controlled by the microprocessor to provide different programmed exposure intervals for each lamp. When all of the lamps have been timed out an audible tone signal is produced to inform the operator of this condition.

Facilities are also provided for operating the basic timer unit either on a 60 Hz line frequency or on a 50 Hz line frequency for usage in foreign countries. A suitable display is also controlled by the microprocessor so that the operator is informed of each exposure interval as it is being pre set and may quickly check all of the intervals selected before starting a photographic operation.

The plug in light integrator arrangement of the present invention measures the current flowing in a photodiode which is subjected to light from the associated lamp, this current being linear with respect to light output of the lamp. The photodiode current output is converted to a corresponding linear voltage which is then converted to variable frequency pulses which are supplied to the microprocessor unit through the multiplexer and counted to obtain the desired exposure interval.

The pulses developed by each light integrator unit are arranged to have approximately the same frequency as 60 Hz timer pulses developed from the line voltage source when the photodiode is subjected to a light source of normal intensity. With such an arrangement the exposure intervals selected when a light integrator unit is employed will be generally similar to the exposure interval measured in seconds which the operator selects when a simple timer is used.

The invention both as to its organization and method of operation, together with further objects and advantages thereof, will best be understood by reference to the following specification taken in connection with the accompanying drawings.

BRIEF DESCRIPTION OF THE DRAWINGS

FIG. 2 is a schematic diagram, partly in block diagram form, of the light integrator portion of the system of FIGS. 1A and 1B;

FIG. 3 shows the layout of the keyboard employed in the system of FIGS. 1A and 1B; and FIGS. 4 to 10, inclusive, comprise a flow chart showing the manner in which the microprocessor of the system of FIGS. 1A and 1B is programmed to carry out the arrangement of the present invention.

BRIEF DESCRIPTION OF THE PREFERRED EMBODIMENT

Figure 1A:
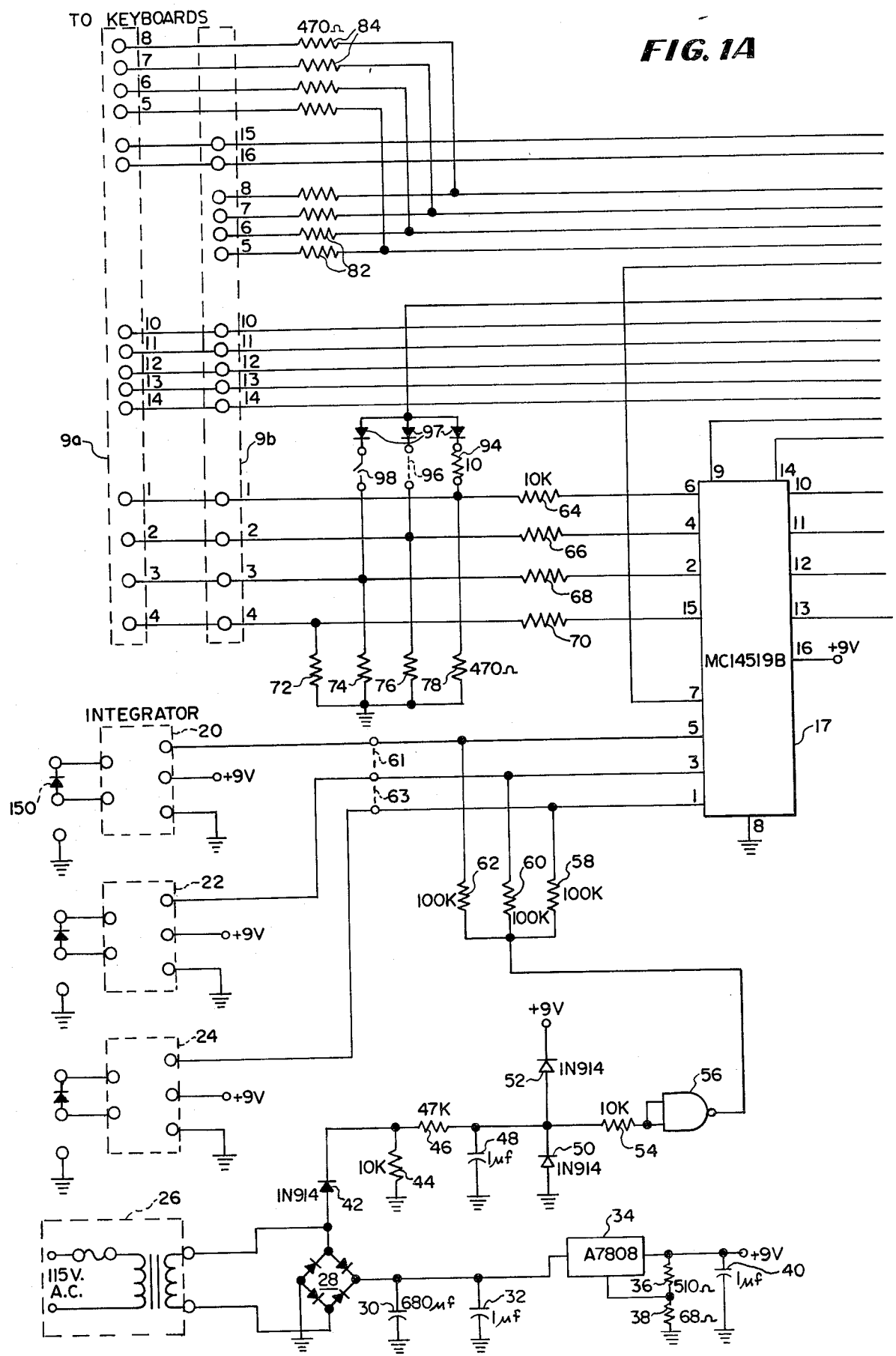
FIGS. 1A and 1B when placed side by side comprise a block diagram of the universal light integrator/timer of the present invention.

Referring now to the drawings, the universal light integrator/timer of the present invention includes as its basic components a keyboard 19 the layout of which is shown in FIG. 3, a digital multiplexer unit 17, which may comprise an integrator circuit of the commercial type MC14519B, a microprocessor 18, which may comprise an integrated circuit of the commercial type TMS1100 available from Texas Instruments, Incorporated, a display unit 151, and a series of light integrator units 20, 22 and 24. The microprocessor 18 is arranged to control a plurality of light sources, identified as lamp 1, lamp 2 and lamp 3, through the power transistors 100, 102 and 104, respectively, and the relays 106, 108 and 110, respectively.

Considering first the layout of the keyboard 19, this keyboard comprises a four by five matrix wherein the first three columns comprise the numbers 0–9, inclusive, for keying in a desired exposure interval. In addition, the bottom key in the first column is identified as a start button and the bottom key in the third column is identified as a stop button.

The fourth and fifth columns of the keyboard 19 are associated with different memories in the microprocessor 18 so that a plurality of desired exposure intervals may be pre set in these memories and may then be instantly called up by the operator for a desired photographic operation. More particularly, the keys identified as M1, M2, M3 and M4 are associated with four memories which can store exposure intervals to be selected for the main lighting source of a photographic studio, or the like. The keys identified as F1 and F2 are associated with memories which may store exposure intervals for the second lamp, which may be a flash lamp in the studio. The keys identified as B1 and B2 are associated with memories which can store exposure intervals for the third lamp which may comprise a back lighting lamp.

The keyboard 19 is arranged to be plugged into either one of the receptacles 9A or 9B, two such receptacles being provided so that identical keyboards 19 may be employed in situations where it is desirable for the operator to move away from the front panel of the equipment during the photographic operation. For example, in some plate makers for the printing industry the film plate may be on one side of a wall and the original being reproduced may be outside of this wall. In such situations a separate keyboard and associated display 151 may be provided at this location to permit the operator to select exposure intervals and operate the equipment without going back to the main panel of the unit.

The four rows of the keyboard 19 are connected through the isolating resistors 64, 66, 68, 70, respectively, to the input terminals 6, 4, 2 and 15, respectively, of the multiplexer 17.

The columns of the keyboard 19 are strobed from the output lines R0–R4 of the microprocessor 18 through the diodes 80 and the receptacle pins 10–14, inclusive. Accordingly, when any one of the keys of the keyboard 19 is depressed a suitable control signal is supplied through the multiplexer 17 to one of the input terminals K1–K4, of the microprocessor 18.

The multiplexer 17 is of the dual four line to single four line type and alternately supplies the signals appearing on the four input terminals 1, 3, 5, 7 or the four terminals 6, 4, 2, 15 to the input terminals K1–K4 of the microprocessor 18.

Figure 1B:
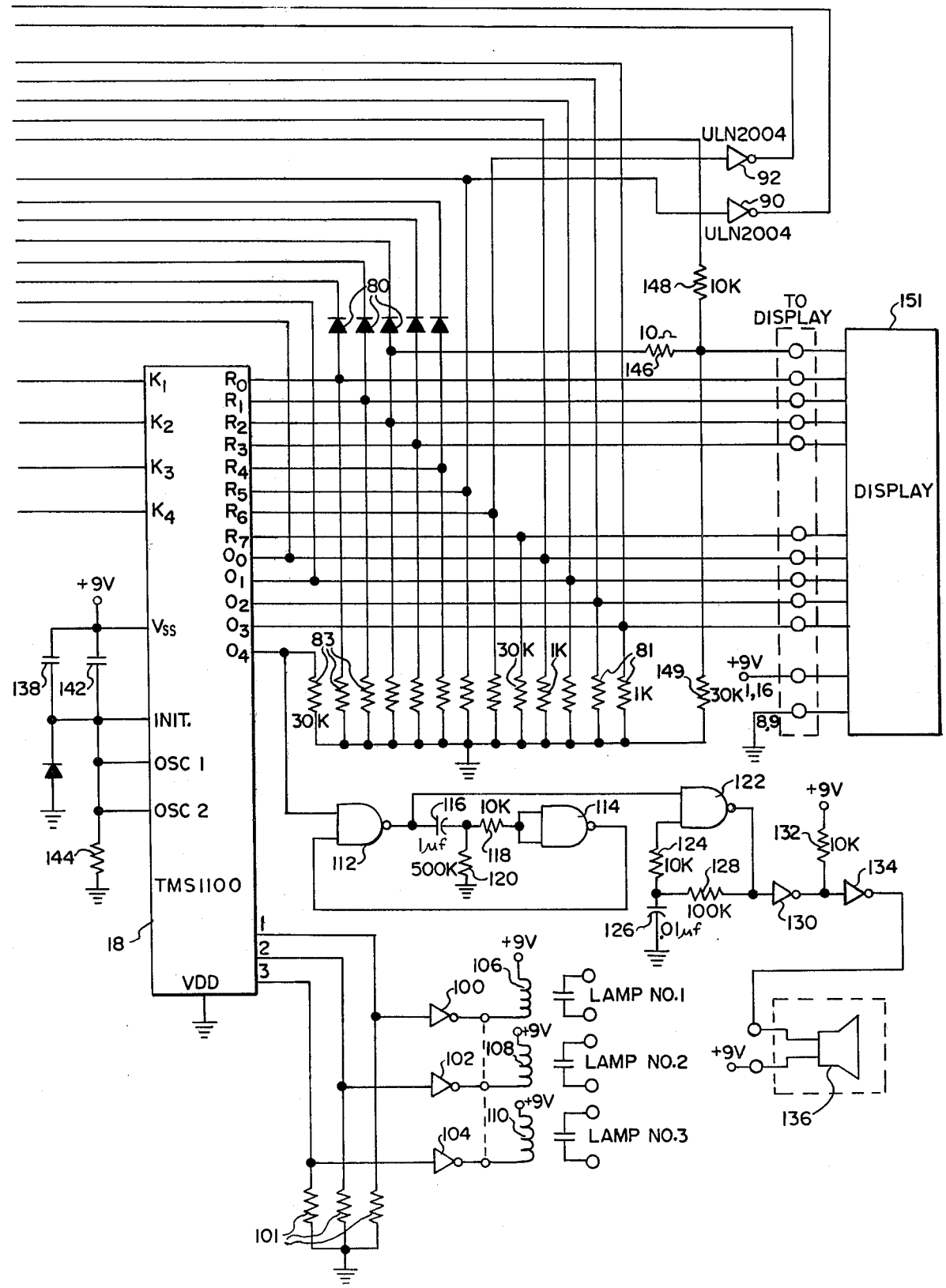

When the unit of FIGS. 1A and 1B is used as a basic timer unit, timing pulses derived from the AC line are supplied to the input terminals 1, 3 and 5 of the multiplexer 17. More particularly, a 60 Hz signal which is derived from the line voltage source 26, is supplied through the diode 42 to a resistor 44, the voltage across the resistor being filtered in the circuit comprising the series resistor 46 and the shunt capacitor 48. This filtered half wave signal is supplied through the resistor 54 to a Schmidt trigger inverter 56, which may be of the commercial type MC 14093B so that sharp pulses occurring at the rate of 60 Hz are developed and supplied through the large series resistors 58, 60 and 62 to the input lines 1, 3, 5, respectively, of the multiplexer 17. The diodes 50 and 52 which are connected to ground and plus nine volts, respectively, are employed to clamp the voltage across the capacitor 48 to these respective levels and prevent overvoltage from being applied to the input of the Schmidt trigger 56.

In order to provide a suitable stabilized DC voltage for the units of the control system, the twelve volt AC signal is supplied to a full wave bridge rectifier 28, is filtered in the capacitors 30, 32 and is applied to a voltage regulator 34 which may be of the commercial type A 7808. Feedback for this regulator is provided through the voltage divider resistors 36, 38 and the output of the regulator 34 is further filtered by the capacitor 40, the +9 volt output of the regulator 34 being supplied to the multiplexer and microprocessor, as well as other portions of the circuitry.

The display unit 151 may comprise any suitable combination of decoder driver and seven-segment display units. Preferably four digits are displayed but facilities are provided for displaying all four digits either with or without a decimal point so that exposure intervals may be displayed in tenths of a second if desired. To accomplish this, a decimal counter is provided in the microprocessor 18 for each of the three controlled lamps, this decimal counter storing in 0.1; 1; 10; 100 and 1000 seconds. If it is desired that the timer display the exposure interval in tenths of a second, the decimal point jumper resistor 146 is connected between the microprocessor terminal R2 and the display 151 for appropriate control of the decimal point indicator in the third decade of the display unit 151.

When the jumper 146 is provided in the control unit of FIG. 1B, a signal is supplied by way of the resistor 148 to the input terminal 7 of the multiplexer 17. This input terminal is sampled along with the timing pulse input terminals 1, 3 and 5 so that the microprocessor is informed that the display should be in tenths of a second. If the resistor 146 is omitted, no decimal point is displayed and no signal is supplied to the input terminal 7 of the multiplexer 17 sp that the most significant digit of the five digits stored in the decimal counter will be selected for display by the first decade of the display unit 151.

In order to provide an indication to the operator that a particular memory associated with one of the lamps has been selected for a pre-set exposure interval, a series of indicator lights are provided for each of the keys in the third and fourth rows of the keyboard 19. These keyboard indicator lights may be individually controlled by the microprocessor 18 by suitable strobe signals in a manner similar to the control of the display 151. More particularly, the anodes of the indicator lights in each row are connected to the respective terminals 5, 6, 7, 8 of the keyboard receptacle 9A or 9B and through the resistors 82 to the respective terminals $O_0$, $O_1$, $O_2$ and $O_3$ of the microprocessor 18, these input terminals being connected to ground through the output resistors 81. If a second keyboard is employed, the anodes of the indicator lights in the fourth and fifth columns thereof would be similarly connected through the resistors 84. The cathodes of all of the four indicator lights in each of the fourth and fifth columns are connected together and to the indicated receptacle terminals 15 or 16 so that they can be controlled by strobe signals developed at the output terminal R5 and R6 of the microprocessor 18 through the respective buffer inverters 90 and 92. Accordingly, when any one of the memory select keys M1–M4, F1, F2, B1 or B2 is selected by the operator that key is continuously illuminated and as the operator selects four digits on the keyboard 19 these four digits are displayed on the display 151 as they are selected by the operator. When a second memory select button is pressed in any of the groups associated with a particular lamp the indicator light associated with the first selected key is extinguished and the displayed exposure interval is loaded into the memory associated with that key while at the same time the second memory select key is illuminated and the digits of the second pre-set interval displayed as the operator selects them. After all of the exposure intervals have been pre-set for each of the lamps, the operator may select any one of the stored exposure intervals for each of the three lamps by pressing the desired memory select keys after which the start button of the keyboard 19 is pressed and the microprocessor 18 responds by controlling the relays 106, 108 and 110, so that each lamp is energized for an exact time interval corresponding to the pre-set exposure interval stored in the associated memory. As each exposure interval is completed, the controlled lamp is turned off. Furthermore, after all of the lamps have been de-energized, the microprocessor 18 provides a signal on the output terminal $O_4$ which is supplied to a one shot multivibrator including the AND gates 112 and 114, the time constant circuit including the capacitor 116 and resistor 120 and a series resistor 118. The output of the one shot 112, 114 is supplied to one terminal of the AND gate 122 which is operated as a one KHz RC feedback oscillator wherein the time constant circuit comprises the series resistor 128 and and the capacitor 126, this feedback signal being supplied to the other input of the AND gate 122 through the resistor 124. The AND gates 112, 114 and 122 may all be of the commercial type MC 14093B. The one shot may have a time constant of approximately one-half second so that a short one KHz signal is supplied through the buffer amplifier 130 to a power amplifier 134 which supplies a suitable current to the loudspeaker 134 so that an audible tone is produced to inform the operator that all exposure intervals have been completed. This audible tone signal is also supplied whenever the operator depresses the stop button of the keyboard 19 by development of a suitable control potential on the terminal $O_4$ of the microprocessor 18.

In order to provide certain options which may be selected by the microprocessor without providing an additional column of keys on the keyboard 19, a sixth control line is supplied from the terminal $R_5$ of the microprocessor 18 to a series of diodes 97 which may be connected to one of the three input lines 2, 4, 6 of the multiplexer 17 if that particular option is to be employed in a particular timer unit. More particularly, if a resistor 94 is connected from one of the diodes 97 to the input terminal 6 of the multiplexer 17, the microprocessor 18 is informed that the timer unit is to be energized from a 50 Hz AC line. However, if the resistor 94 is omitted then the microprocessor 18 is programmed to count timing pulses from a 60 Hz AC line.

If a jumper 96 is connected between one of the diodes 97 and the second input line 4 of the multiplexer 17 the microprocessor is informed that only a single counter is to be used to control a single one of the lamps and all eight of the memories associated with the pre-set memory select buttons M1-M4, F1, F2, B1 and B2 can be assigned to this particular lamp. This option is identified as a single co-nter option and is used in instances where the photographic equipment, such as a plate maker used in the printing industry, has only one associated light source. By using this single counter option, a larger number of different exposure intervals may be pre-set by the operator and used during different photographic operations without the need for additional manual pre-set by the operator.

If a switch 98 is connected between one of the diodes 97 and the third input line 2 of the multiplexer 17, closure of this switch is employed in the microprocessor 18 to disable all of the decade seven-segment displays in the display units 151 as well as all of the indicator lights associated with the pre-set memory select keys M1–M4, F1, F2, B1 and B2 of the keyboard 19. The switch 98 may be conveniently located on the main control panel of the integrator/timer unit of the present invention and is employed to disable all of the display and indicator lights when these lights would interfere with a particular photographic operation, such as one involving an exposure to red light, or the like.

Referring now more particularly to the light integrator units 20, 22 and 24, and with reference to FIG. 2 wherein one of these integrator units is shown in conjunction with a photodiode 150, the photodiode 150 is positioned to receive light from one of the controlled lamps, such as lamp number 1, when this lamp is providing light during a photographic operation. An appropriate filter may be positioned between the photodiode 150 and the lamp being controlled so that the light striking the photodiode is limited to the wavelengths at which the specific photographic emulsions being used in the film are sensitive.

In accordance with an important aspect of the present invention the photodiode 150 is connected to an operational amplifier 160 so that the current flowing through the photodiode 150 when it is exposed to light is measured rather than the voltage developed across this photodiode. More particularly, the photodiode 150 is connected through the resistors 152 and 154 to the two inputs of the operational amplifier 160, which may be of the commercial type 3140.

Since the current flowing through the diode 150 is linear with respect to light output from the associated lamp, the operational amplifier 160 is employed to measure this current and convert it into a corresponding output voltage which is also linear with respect to light output of the associated lamp. More particularly, the non-inverting input of the operational amplifier 160 is suitably biased by means of the resistor 158 connected to ground and the resistor 156 connected to the +9 volt supply of the main integrator/timer unit. Feedback between the output of the operational amplifier 160 and the non-inverting input is provided through the resistor 162 and capacitor 164 so that the linear current signal developed by the photodiode 150 is converted into a correspondingly linear voltage which is supplied through the resistor 166 to the input of a voltage to frequency converter 168 which may be of the commercial type 4151. Preferably, the converter 168 is arranged to provide pulses having a frequency of approximately 4 KHz when the photodiode is subjected to light from a lamp of normal intensity. As the intensity of this lamp varies the frequency of the pulses developed by the voltage to frequency converter 168 will vary correspondingly. Preferably, the voltage-to-frequency converter 168 is arranged to go as high as 12 KHz so that light sources substantially above normal intensity may be accommodated by the light integrator units 20, 22 and 24. Also, the counting circuits within the microprocessor 18 are arranged so that they can count input pulses at this much higher rate without losing any pulses so that a wide range of lamp intensities can be accommodated by the light integrator-microprocessor counting combination of the present invention.

In accordance with a further aspect of the present invention a frequency divider 170 is employed to reduce the frequency of the output pulses of the voltage-to-frequency converter 168 by a factor of sixty-four so that output pulses from the light integrator units 20, 22 and 24 when the associated photodiode is subjected to a light of normal intensity, will have a frequency of approximately 60 Hz. With such an arrangement the operator, who is usually familiar with the exposure time for a particular photographic operation measured in seconds, can readily set up the corresponding exposure time when a light integrator unit is used with a lamp whose light intensity and wavelength characteristic may vary greatly as a function of lamp temperature at the time the lamp is turned on.

The output of the divider 170 is supplied through the resistor 172 to one of the inputs 1, 3 or 5 of the multiplexer unit 17. As discussed generally heretofore, when one of these light inegrator units is connected to the multiplexer 17 the low impedance output of the divider 170, as compared to the values of the coupling resistors 58, 60 and 62, is effective automatically to change the control unit to a light integrator from a timer for that particular channel of the multiplexer. Accordingly, the multiplexer no longer responds to the timing pulses supplied to the resistors 58, 60 and 62 whenever a light integrator unit is plugged into one of the corresponding channels of the multiplexer 17. Furthermore, such operation is automatic in that the operator need only plug in one of the integrator units 20, 22 or 24 to effect changeover from a basic timer unit to a light integrator unit.

It is contemplated that the jumper wire 96 will be provided at the factory for those units which will be designated as single counter units and purchased solely for operation with a single main lamp source. However, if the jumper 96 is omitted so that the control unit normally functions to control three different lamps, as described above, the operator may readily convert the control unit of the present invention to single lamp operation. This is done by connecting the jumpers 61 and 63 across the integrator unit output terminals so that all three inputs 1, 3 and 5 of the multiplexer 17 may be controlled by a single light integrator unit, such as the unit 20. Similarly, the outputs of the three inverting buffers 100, 102 and 104 may also be connected together, as indicated in dotted lines in FIG. 1B, so that one of the relays, such as the relay 106, may control a single lamp in response to the output from any one of these three inverting buffers. With such an arrangement, all eight of the memories in the microprocessor 18 may be employed to store pre-set exposure intervals which can be then used with a single lamp source under the control of a single light integrator unit.

In accordance with a further aspect of the present invention, facilities are provided so that the operator can turn on any one of the controlled lamps and leave it on for an indefinite length of time. Such an arrangement is useful where the operator wishes to employ the lamps during an initial setup period, or the like, in connection with the photographic operation. More particularly, if the operator presses one of the pre-set memory select buttons associated with a particular lamp, such as the key M1 and then presses the zero key of the keyboard 19, he may thereafter press the start button of the keyboard 19 and turn on the associated lamp independently of the light integrating or light timing functions of the control unit of the present invention. Such an arrangement is achieved because the zero key of the keyboard 19 is never used as an initial digit and all leading zeros are suppressed. Accordingly, the sequence of selection of a pre-set memory select key followed by the zero key and then the start key of the keyboard 19 is employed to turn the selected output relay on and leave it on independently of the exposure interval pre-set in the key which was punched. The controlled lamp then stays on until the stop button of the keyboard 19 is pressed.

Considering now the manner in which the microprocessor 18 is employed to count either the timing pulses supplied to the multiplexer inputs through the resistors 58, 60 and 62 or the light integrator pulses supplied from the units 20, 22 and 24, it will be recalled that these pulses are normally occurring at 60 Hz rate. Since the display unit 151 may be set up to display in tenths of a second, the input pulses supplied to the microprocessor 18 are initially counted in a software divider, the output of this divider then being supplied to a five-stage decimal counter. One of these five stage decimal counters is provided for each of the controlled lamps. The counter divider is decremented on each 0 to 1 transition of the timing pulses (or light integrator pulses) and when this divider goes below zero the divider is reloaded with the number six and at the same time the five-stage decimal counter is decremented. The selected memory pre-set number, which is called up from one of the memories of the microprocessor 18 by punching one of the pre-set memory select keys of the keyboard 19, is initially set into this decimal counter and as timing pulses or light integrator pulses are counted during the exposure interval the decimal counter is decremented back to zero. When this counter reaches zero the associated relay is controlled through one of the inverting buffers 100, 102 or 104 so as to turn off the associated lamp.

When the jumper resistor 94 is included in the control unit to indicate that the control unit will be operated from a 50 Hz AC line, the counter divider is loaded with the number 5 so that it provides output pulses representing 0.1 seconds for each five timing pulses.

Figure 4:
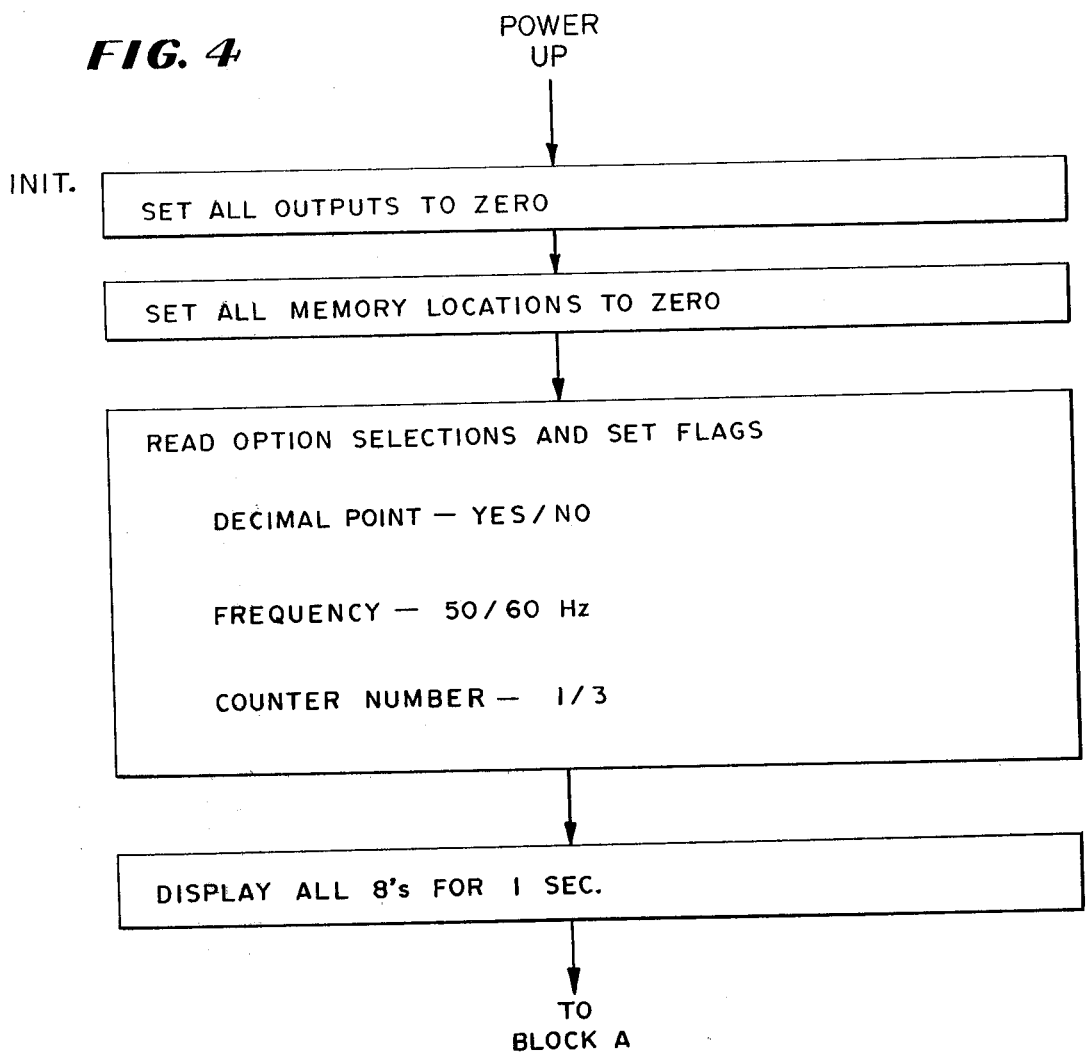

The software necessary to carry out the above-described sequence of events in the microprocessor 18 may be developed in accordance with the flow chart shown in FIGS. 4–10, inclusive. Referring to FIG. 4, the initialization procedure shown in this FIG. is performed each time the power is applied to the control unit of the present invention. More particularly, when power is applied, all of the lamp relays 106, 108 and 110 are initially set to zero and all the memory locations within the microprocessor are also set to zero. The various options selections are read by the microprocessor in preparation for the counting operation. More particularly, if the decimal point jumper resistor 146 is present, indicating that the display unit 151 should display an exposure interval to a tenth of a second, the microprocessor is set to display the most significant digit minus one. On the other hand, if the resistor 146 is omitted the most significant digit is displayed. If the line frequency jumper resistor 94 is omitted the microprocessor is set to reload the counter divider with 6 each time it goes below zero. On the other hand, if the resistor 94 is present, indicating that a 50 Hz AC line supply is being used, this counter divider is reloaded with 5 each time it goes below zero. Also, if no jumper 96 is provided to the input line 4 of the multiplexer 17, the microprocessor 18 is arranged to control all three of the indicated lamps. However, if the jumper 96 is present all eight of the memories associated with the individual pre-set memory select keys of the keyboard 19 will be assigned to one of the timing-light integrator inputs of the multiplexer 17 and will control only one of the lamp output relays, such as the relay 106.

After the initialization procedure, the program steps called for in the subsequent blocks A-E, inclusive, shown in FIGS. 5–10, inclusive, are repetitively performed so that as the operator selects different ones of the pre-set memory select keys of the keyboard 19 and punches in desired exposure intervals, these intervals are displayed on the display unit 151. Also, the indicator light associated with each of these pre-set memory select keys is illuminated, either continuously as the exposure interval is punched in, or intermittently after the start button has been turned on and the selected counter enabled to count the incoming timer or light integrator pulses.

Figure 5:
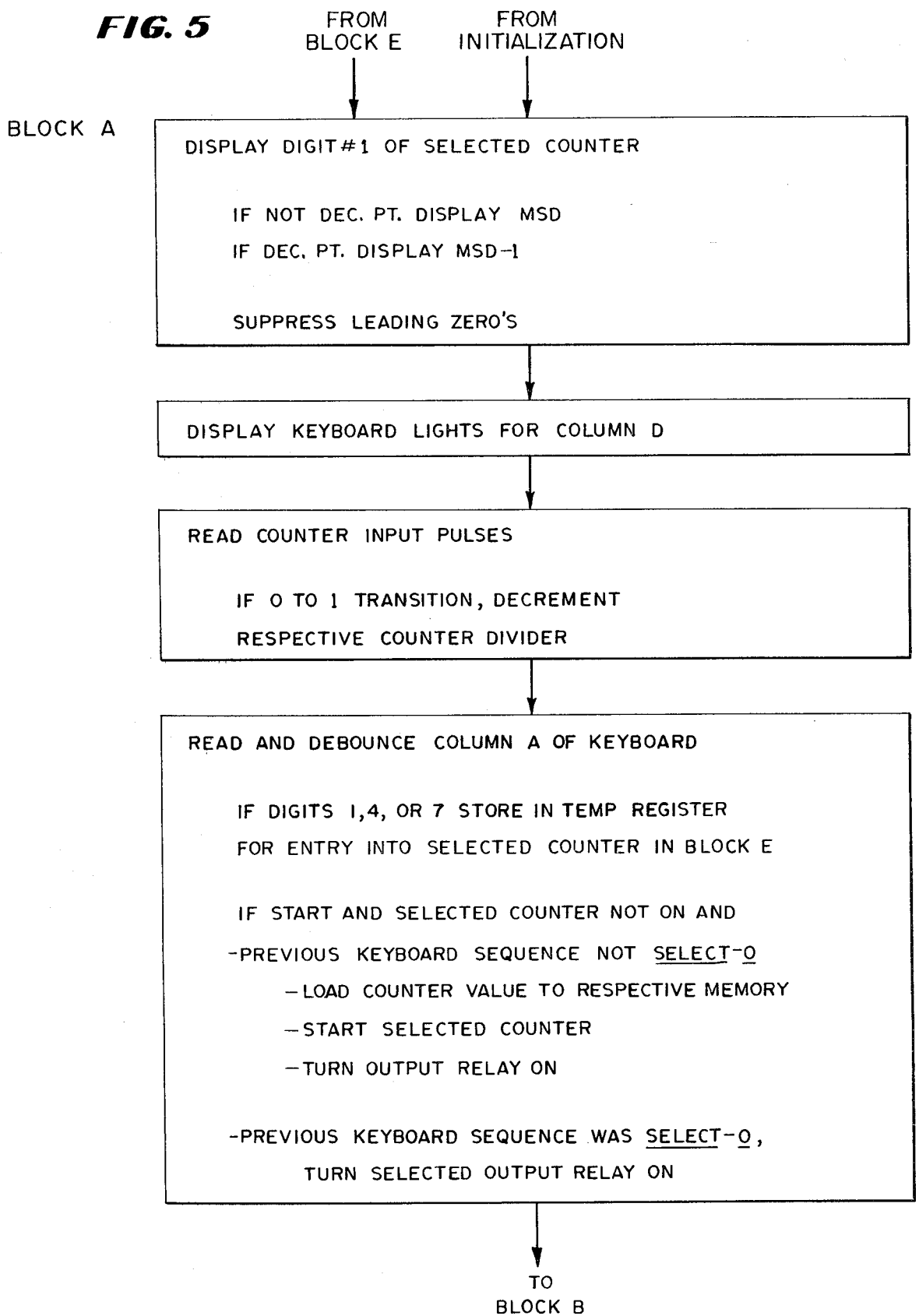
Figure 6:
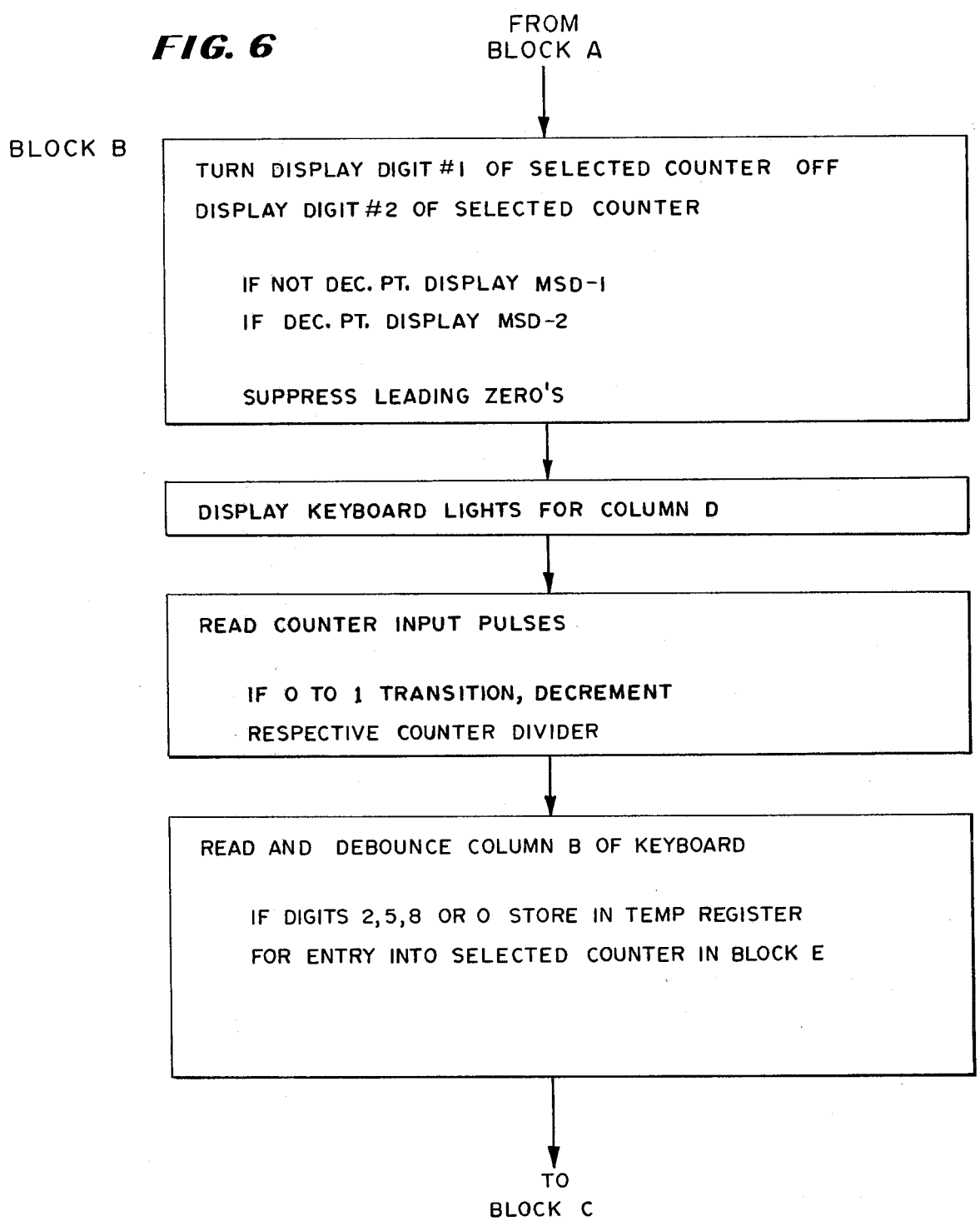
Figure 7:
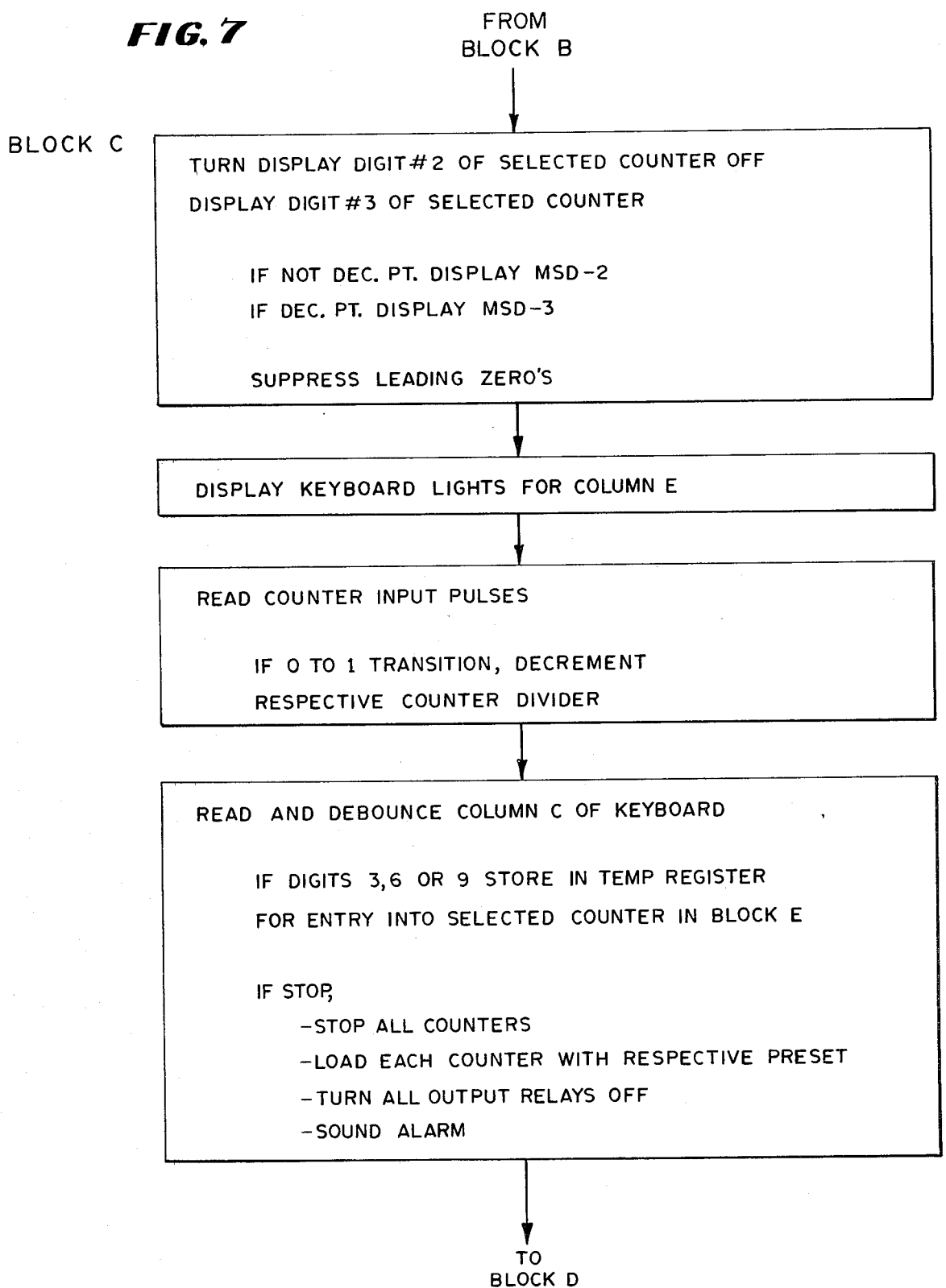
Figure 8:
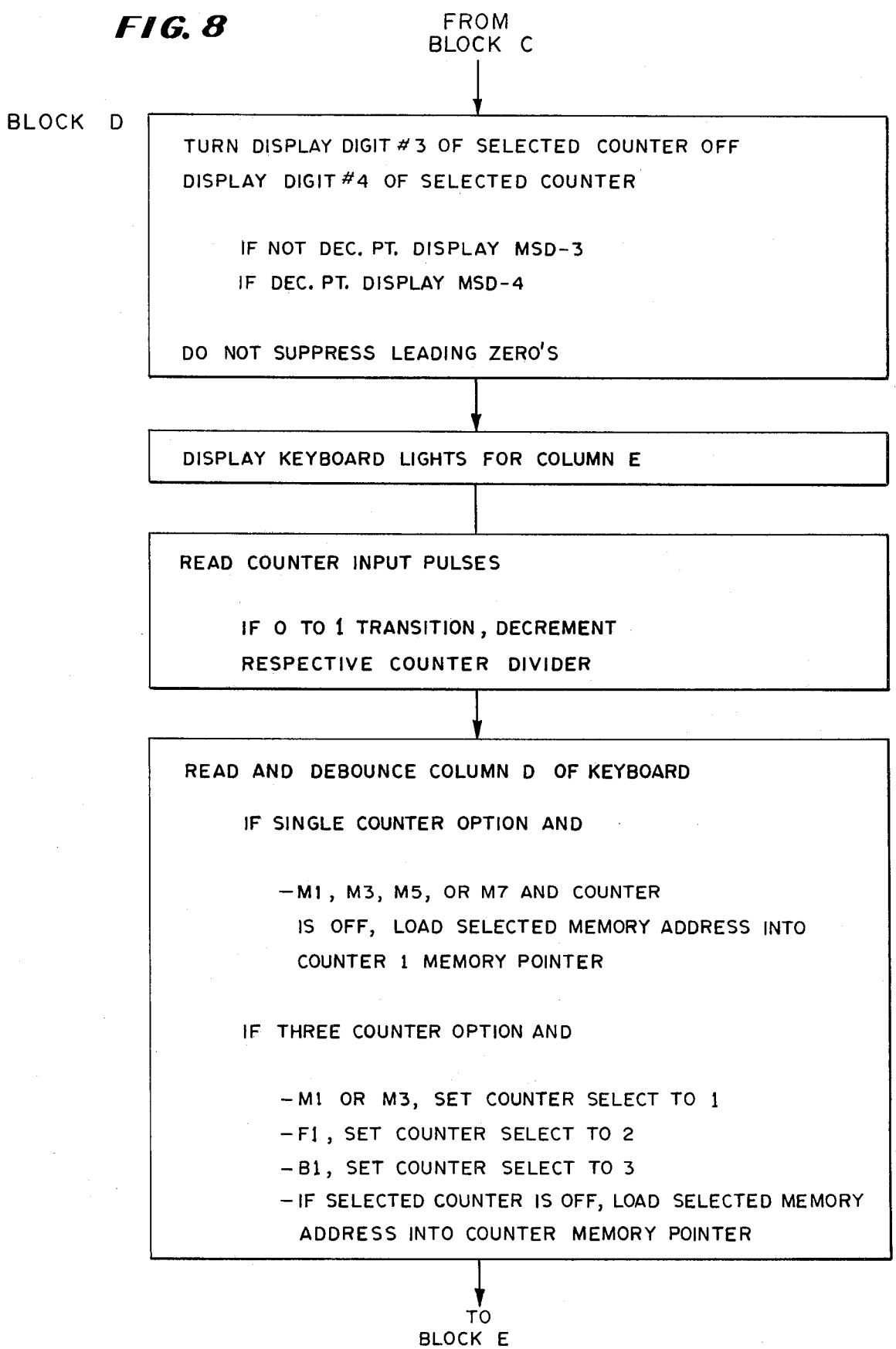
Figure 9:
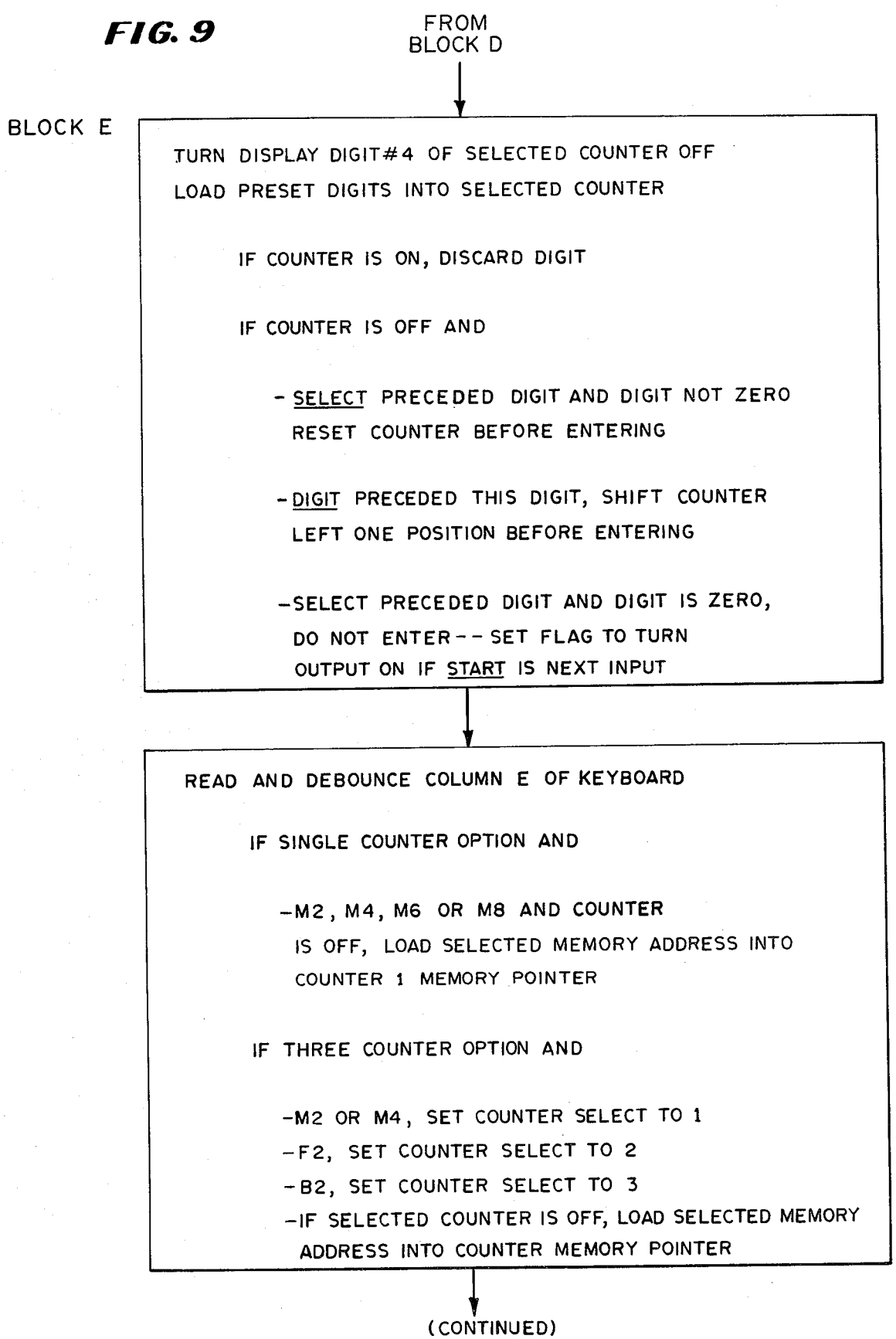

The final block of the block A instruction shown in FIG. 5 also indicates the manner in which the microprocessor 18 responds a sequence of a pre-set memory SELECT key, the zero key and then the start key by turning on the selected output relay so that the associated lamp may be continuously energized for an indefinite period of time, as described in detail heretofore.

In the flow chart of FIGS. 4 to 10, inclusive, the five columns of the keyboard 19 are indicated as the columns A-E, inclusive. Also, the term SELECT in the final block of FIG. 5 is used to designate any one of the pre-set memory select keys M1-M4, F1, F2, B1 and B2 of the keyboard 19.

While there has been illustrated and described a preferred embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In an arrangement for determining the exposure time for photographic plates, film, or the like, the combination of a source of light for illuminating a photographic plate or film, a photodiode positioned in the path of said light source, means connected to said photodiode for developing a voltage proportional to the current flowing through said diode in response to light excitation from said source, means for converting said voltage into electrical pulses the rate of occurrence of which is proportional to the amplitude of said voltage, means for counting said electrical pulses, means controlled by said counting means for de-energizing said light source when a predetermined amount of light has been emitted thereby, means for developing timing pulses of a predetermined fixed frequency, and means for supplying said timing pulses to said counting means in place of said electrical pulses.

2. The combination of claim 1, which includes a source of alternating current line voltage, and means for deriving said timing pulses from said line voltage source.

3. The combination of claim 2, which includes means for adapting said counting means to count timing pulses derived from line voltages having different frequencies.

4. The combination of claim 3, wherein said different line voltage frequencies are 60 hertz and 50 hertz.

5. In an arrangement for determining the exposure time for photographic plates, film or the like, the combination of a plurality of light sources, a photodiode positioned in the path of each of said light sources, means connected to each of said photodiodes for developing sets of electrical pulses the rate of occurrence of which is linearly proportional to the current flowing in the associated photodiode, means for counting said electrical pulses, multiplexer means for sequentially connecting pulses from each of said sets to said counting means, and means controlled by said counting means for de-energizing each of said light sources when a predetermined amount of light has been emitted thereby.

6. The combination of claim 5, which includes means for developing an audible signal when all of said plurality of light sources have been de-energized.

7. In a light integrator/timer for photographic equipment, the combination of, means for developing timing pulses having a predetermined fixed rate of occurrence, pulse counting means having an input, means for connecting said timing pulses to said input so that said counting means is operative to count said timing pulses, a light source controlled by said counting means, light integrator means arranged to develop pulses which vary in frequency in accordance with variations in the intensity of said light source, and means for supplying said light integrator pulses to said input in place of said timing pulses.

8. The combination of claim 7, wherein said timing pulses are permanently connected to said input through a relatively large series resistor and said light integrator means has a low impedance output circuit connected to said input, whereby said timing pulses are counted by said counting means only during periods when said light integrator means is disconnected from said input.

9. The combination of claim 7, wherein said timing pulses are permanently connected to said input through a relatively large series resistor, and said light integrator means has an output circuit of substantially lower impedance than said resistor, whereby connection of said light integrator output circuit to said counting means input is effective to cause said counting means to count said light integrator pulses instead of said timing pulses.

10. In a light control unit for use in photographic equipment, the combination of, a light source, keyboard means including at least one memory preset key for said light source and a start key, means controlled by said memory preset key for storing numerical representations corresponding to a desired photographic exposure, means jointly controlled by said stored numerical representations and said start key for energizing said light source for said desired exposure, means for continuously illuminating said memory preset key prior to energization of said light source, and means for intermittently illuminating said memory preset key during energization of said light source.

11. The light control unit of claim 10, which includes means for developing timing pulses having a predetermined fixed rate of occurrence, and means included in said energizing means for counting said timing pulses to determine the extent of said exposure.

12. The light control unit of claim 10, which includes light integrator means for developing pulses which vary in frequency in accordance with variations in the intensity of said light source, and means included in said energizing means for counting said light integrator pulses to determine the extent of said exposure.

13. The combination of claim 10, wherein said keyboard means includes a plurality of memory preset keys, and means for storing numerical representations corresponding to different photographic exposures for each of said memory preset keys.

14. The combination of claim 10, which includes a plurality of light sources, said keyboard means includes at least one memory preset key for each of said light sources, means controlled by each of said memory preset keys for storing numerical representations corresponding to a desired photographic exposure for each of said light sources, said energizing means controlling each of said light sources in accordance with said stored numerical representations.

15. The combination of claim 4, wherein initial energization of all of said plurality of light sources is controlled by said start key.

16. In a light control unit for use in photographic equipment, the combination of, a light source, keyboard means including at least one memory preset key for said light source and a start key, means controlled by said memory preset key for storing numerical representations corresponding to a desired photographic exposure, light integrator means for developing pulses which vary in frequency in accordance with variations in the intensity of said light source, means controlled by said start key for initiating energization of said light source, and means for terminating energization of said light source when the number of said light integrator pulses developed after initial energization of said light source equals said stored numerical representations.

* * * * *

UNITED STATES PATENT AND TRADEMARK OFFICE
CERTIFICATE OF CORRECTION

PATENT NO. : 4,318,613

DATED : March 9, 1982

INVENTOR(S) : William P. Waiwood

It is certified that error appears in the above-identified patent and that said Letters Patent are hereby corrected as shown below:

Column 12, line 17, "4" should read --14--.

Signed and Sealed this

First Day of June 1982

[SEAL]

Attest:

Attesting Officer

GERALD J. MOSSINGHOFF

Commissioner of Patents and Trademarks